US005434733A

United States Patent [19]
Hesterman et al.

[11] Patent Number: 5,434,733
[45] Date of Patent: Jul. 18, 1995

[54] PLANAR HEAD HAVING SEPARATE READ AND WRITE GAPS

[75] Inventors: Victor W. Hesterman, Los Altos Hills; Manoj K. Bhattacharyya, Sunnyvale, both of Calif.

[73] Assignee: Hewlett-Packard Company, Palo Alto, Calif.

[21] Appl. No.: 198,820

[22] Filed: Feb. 18, 1994

[51] Int. Cl.6 .......................... G11B 5/39; G11B 5/29
[52] U.S. Cl. ...................................... 360/113; 360/121
[58] Field of Search ............................... 360/113, 121

[56] References Cited

U.S. PATENT DOCUMENTS

| 4,803,580 | 2/1989 | Mowry | 360/121 X |
|---|---|---|---|
| 4,881,143 | 11/1989 | Bhattacharyya et al. | 360/113 |
| 4,907,113 | 3/1990 | Mallary | 360/121 X |
| 4,949,207 | 8/1990 | Lazzari | 360/119 |
| 4,967,298 | 10/1990 | Mowry | 360/121 X |
| 5,103,553 | 4/1992 | Mallary | 360/121 X |

Primary Examiner—John H. Wolff

[57] ABSTRACT

A planar silicon magnetoresistive read/write head has separate read and write gaps that can be individually optimized. The write gap includes a write gap shunt that suppresses signals that are read across the write gap without interfering with the ability of the head to generate write signals at the write gap. The head retains both the advantages of removing the magnetoresistive element from the air bearing surface to avoid wear, shorting, and corrosion, and to eliminate cross-track asymmetry, associated with dual gap magnetoresistive heads; and the advantages of low cost fabrication and high area density, associated with silicon planar head structures.

18 Claims, 4 Drawing Sheets

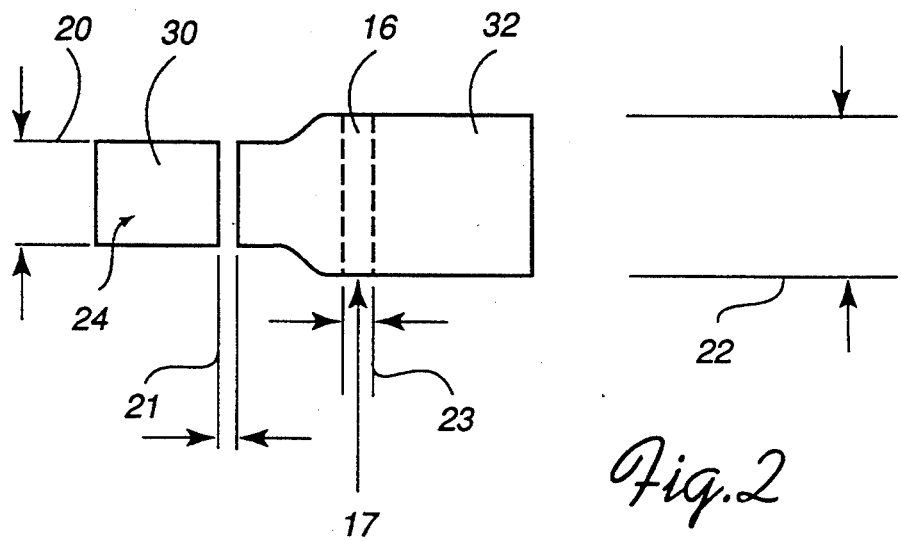
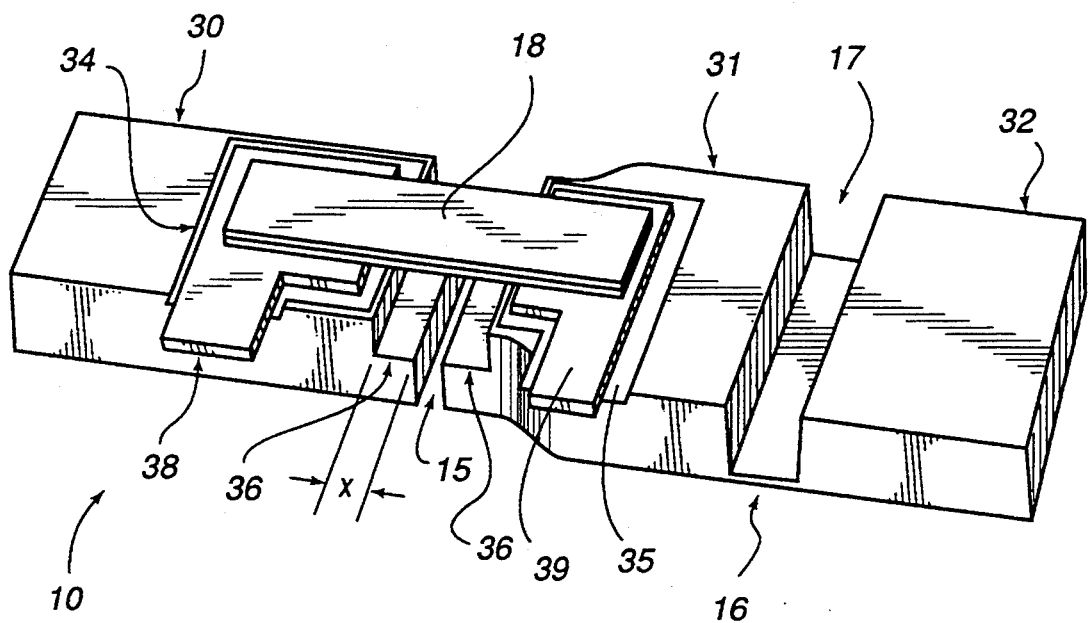

PLANAR HEAD HAVING SEPARATE READ AND WRITE GAPS

BACKGROUND OF THE INVENTION

1. Technical Field

The present invention relates to magnetic read and write heads. More particularly, the present invention relates to a planar silicon head having a magnetoresistive element associated with a read gap, and having a separate write gap.

2. Description of the Prior Art

The level of recording medium noise in a magnetic recording is generally larger at the edges of a recorded track than in the center of the track. Therefore, it is desirable to provide a magnetic head having a read width that is somewhat narrower than the write track width. A narrower read head, when positioned toward the center of a recorded track, only senses information from the center of the track and not the noise at the edges of the track. Providing a wider write track width also ensures the complete erasure of old data and the rewriting of a new track that is wide enough to avoid subsequent reading of the old data at the track edges due to servo tracking error. This makes for good overwrite performance. Magnetoresistive ("MR") heads having inductive write gaps that are separate from the MR read gaps are known. Separation of the read and write gaps allows the two gaps to be individually optimized. Typically, MR heads have an inductive write gap that is longer than the read gap, and a write track width that is wider than the read track width, See, for example C. Tsang et. al., *Gigabit Density Recording using Dual-Element MR/Inductive Heads on Thin-Film Disks*, IEEE Trans. Mag., Vol. 26, No. 5 (September 1990).

Known dual gap MR heads have one edge of the magnetoresistive element ("MRE") exposed to the head air bearing surface ("ABS"). As such, the MRE is subjected to excessive wear, and is prone to shorting and corrosion. Magnetoresistive heads also have an asymmetric cross-track profile that complicates servo design. See, for example T. C. Anthony et al, *Dual Stripe Magnetoresistive Heads for High Density Recording*, IEEE Trans. Mag., Vol. 30, No. 2 (to be published March 1994).

In the patent application, V. W. Hesterman, M. K. Bhattacharyya *A Planar Magnetoresistive Head*, Ser. No. 08/146,255, filed Nov. 1, 1993, and commonly assigned to Hewlett-Packard Company, which discloses a silicon planar head, an MRE is located across the head gap for reading. In such a head, the thin-film MRE is located away from the ABS by bridging the MRE across the gaps of a magnetic yoke. The magnetic yoke includes a write coil for writing, and the MRE reads information. During manufacture of the head, the yoke is formed from a thin-film ferromagnetic material deposited in a cavity formed in a substrate. The thin-film MRE is positioned across the gap on the side of the yoke opposite the air bearing surface. This arrangement, of positioning the MRE away from the ABS, solves the problems of excessive wear and corrosion of the MRE, and also eliminates the asymmetric nature of the cross-track response. However, in this design the same gap performs both the reading and writing operations, and consequently the read and write track widths are identical. The construction process for an inductive version of a planar silicon head is described in J. P Lazzari, *Planar Structure Thin Film Magnetic Head*, U.S. Pat. No. 4,949,207 (Aug. 14, 1990).

It would be advantageous if separate read and write gaps could also be incorporated into a planar silicon magnetoresistive head.

SUMMARY OF THE INVENTION

The invention provides a low cost planar magnetoresistive head that features both high areal density, and separate read and write gaps having individually optimized track widths. The head retains the advantages of having an MR element that is removed from the ABS to avoid wear, shorting, and corrosion; and eliminates cross-track asymmetry, associated with conventional magnetoresistive heads; and retains the advantages of low cost fabrication and high area density, associated with silicon planar head structures.

The head includes a magnetoresistive element positioned across the read gap. A separate write gap is spaced from the read gap and includes a write gap shunt. The write gap shunt prevents the head from reading at the write gap. The head does not produce false transitions, and is therefore highly accurate. The write gap shunt is of sufficiently thin to saturate easily and thus prevent shunting a significant amount of write flux. The write gap shunt is ideally optimized to prevent signal reading at the write gap, without interfering with head writing.

BRIEF DESCRIPTION OF THE DRAWINGS

FIG. 2 is a schematic air bearing surface view of a planar magnetoresistive head showing the head poles and gaps, but not showing the main part of the yoke, according to the invention;

FIG. 3 is a schematic perspective view of a planar magnetoresistive head showing the head structure, but not showing the main part of the yoke, according to the invention;

DETAILED DESCRIPTION OF THE INVENTION

The invention provides a read/write head having separate read and write gaps that can be individually optimized. The head includes a magnetoresistive element ("MRE") that is positioned away from the ABS to avoid wear, shorting, and corrosion, and also to eliminate cross-track asymmetry, and thereby improve head servoing. The magnetic head also has important low cost advantages, such as fabrication by standard semiconductor processing techniques, without the need for the grinding or dicing operations that are required to fabricate most prior art magnetic heads. The head offers the advantages of low cost fabrication of a silicon head structure, and also provides a very high areal density because of the following: a high signal output level achieved by the MRE, a small read gap, and reduced noise because of a read track width that is narrower than the write track width.

Figure 1:
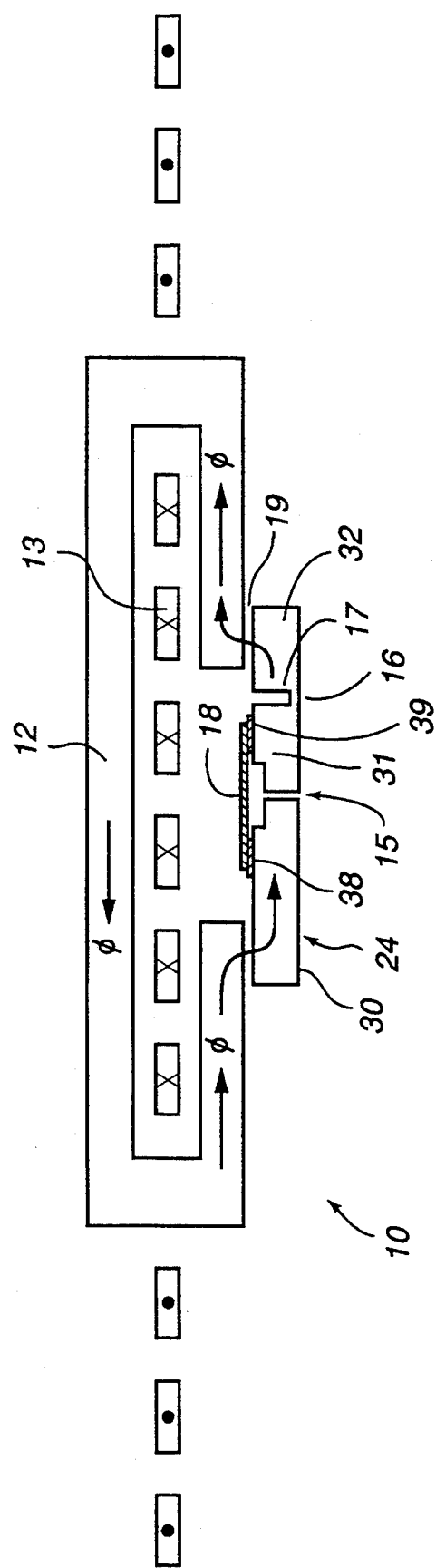
FIG. 1 is a schematic side elevation view of a planar magnetoresistive head having separate read and write gaps according to the invention.

FIG. 1 is a schematic side elevation view of a silicon planar magnetoresistive head 10 having a separate read gap 15 and write gap 17. The magnetic head may be formed on any suitable substrate, such as silicon (not shown), which is used in the preferred embodiment of the invention. The head 10 is fabricated from the top down, i.e. a yoke 12 is formed before the gap structure is formed. The ferromagnetic yoke 12 is fabricated on the silicon substrate (not shown); a conductive write coil 13 is deposited around the yoke. The number of turns in the write coil need not approach the very large number of turns required in an inductive read head to obtain high signal levels. For example, in the preferred embodiment of the invention only about 20 to 30 turns are required. Thus, the head of the invention can use a single layer write coil.

The yoke 12 is formed of a high permeability ferromagnetic material. A current supplied to the write coil generates magnetic flux through the yoke. The yoke is separated from a gap structure by one or more side gaps 19. The side gap is filled by a nonmagnetic material such as silicon dioxide. The side gaps 19 are used to reduce or prevent the coupling of stray magnetic fields into the MRE 18. Poles 30, 31 define the read gap 15.

The MRE 18 is positioned across the read gap 15 to sense magnetic transitions in a recording medium near the read gap. The air bearing surface ("ABS") 24 is shown at the bottom of the head in FIG. 1. Different types of MRE can be used. For example, a patterned Nickel-Iron thin-film of the type described in Nan-Yeh, *Narrow Track Magnetoresistive Transducer Assembly*, U.S. Pat. No. 4,356,523 (Oct. 26, 1982) consists of two thin ferromagnetic films separated by a thin non-ferromagnetic layer. Such MRE is stable and relatively free from Barkhausen noise. The MRE allows a sense current to flow along its active length to sense its change in resistance when the head is reading. This is beneficial because an MRE having a long x-direction can then be produced to increase MRE overlap with the poles, which, in turn, reduces the reluctance between the poles and the MRE.

A giant magnetoresistive type of MRE could also be used to obtain still larger signals.

The MRE is electrically connected to two ferromagnetic leads 38, 39 that are interposed between the MRE and the two poles 30, 31. The two leads, one on each end of the MRE, allow a sense current to pass through the MRE when reading information from the magnetic medium (not shown). The leads are preferably made of a ferromagnetic material with high permeability to decrease the reluctance between the poles and the MRE. It is also preferred that each lead occupy a substantial area in proximity with one of the poles to reduce further the reluctance between the poles and the MRE. The leads are separated from the poles by a thin dielectric spacer, such as the insulating films 34, 35 shown in FIG. 3.

In the preferred embodiment of the invention, the yoke 12, poles 30, 31, 32, and the ferromagnetic leads 38, 39 are made of permalloy (NiFe); the insulating films 34, 35 are made of silicon dioxide; and the side gap 19 is filled by silicon dioxide.

In the invention, the head includes a separate write gap 17 that is defined as part of the same pole structure as the read gap. In the example shown in FIG. 1, the write gap is defined by two poles 31, 32. The write gap is placed on the trailing side of the yoke relative to the direction of medium travel so that any transition written by the magnetic field generated by the read gap is rewritten by the trailing edge of the write gap. The read and write gap lengths and widths can be separately optimized for their own respective functions. For example, the read gap can be short and narrow, whereas the write gap can be somewhat wider and larger. However, there are some restrictions, as discussed below.

It is significant in the invention that the write gap also includes a magnetic shunt 16, i.e. a write gap shunt ("WGS"), at the air bearing surface ("ABS") (indicated by numeric designator 24 in FIG. 2), to prevent the write gap from sensing media transitions at this second gap. Thus, the write gap shunt serves to shunt any write gap signal flux that could otherwise get into the MRE and be read.

The write gap shunt is preferably made very thin, e.g. about 30 nm, so that it is easily saturated by the write field. To improve fabrication yields, the WGS can be made thicker by using a material that has a lower magnetic saturation ("Ms") compared to the other pole material, which is NiFe for most cases. The low Ms material can be thicker and still be easily saturated by the write current.

Various other process steps that are part of the fabrication of the silicon planar head structure that forms a part of the invention, but which are not detailed herein, are well known to those skilled in the art. See, for example J. P. Lazzari, *Planar Structure Thin Film Magnetic Head*, U.S. Pat. No. 4,949,207 (Aug. 14, 1990).

During a write operation, a write current is sent through the write coil 13 to generate the magnetic flux in the yoke 12 and across the write gap 17. The magnetic flux across the write gap writes information onto the magnetic medium. During a read operation, a sense current is sent through the MRE. The resulting signal voltage is measured by read channel electronics (not shown). In the preferred embodiment of the invention, the write current is about 1000 mAt or milli-Ampereturns; the sense current is about 15 mA; and the bias current is about 6 mAt. The above example is capable of writing and reading a magnetic medium with a track width of about 2 $\mu$m, and an areal density of about 1 Gbit per square inch, i.e. bits of information stored per square inch.

The flux for the write gap must pass through the read gap, as well as the side gaps and the rest of the yoke and pole structure. It is necessary to optimize the magnetic reluctance of these gaps to allow adequate write fields to be obtained across the write gap, and yet not produce either excessive leakage flux across the read gap in the read mode, or excessive stray field sensitivity, i.e. because the side gaps are too small.

The read structure should have a low reluctance between the MRE and the poles, compared to the read gap reluctance. Then the head can have a small read gap without excessive loss of signal flux from the MRE. Very large signal flux values have been obtained by finite element calculation using the exemplary head.

The separation between the read gap and the write gap should be made as small as possible to minimize servo tracking error for rotary actuators as the head moves from inner diameter to outer diameter. However, adequate space must be allowed from the ferromagnetic lead 39 on the pole 31.

FIG. 2 is a schematic view of a silicon planar magnetoresistive head showing the head poles and gaps at the air bearing surface according to the invention. The bottom ABS view of FIG. 2 shows a head having a write gap that is wider than the read gap. In some embodiments of the invention, the write gap could alternatively be made narrower than the read gap, if desired. The exemplary head has a read gap 15 having a read gap length 21 of about 0.2 μm, and a read track width 20 of about 0.5 μm to 3.0 μm, and preferably about 1.0 μm. The write gap 17 has a write gap length 23 of about 0.6 μm, and the write track width 22 of about 1.0 μm to 4.0 μm, and preferably about 2.0 μm. The write gap should be spaced from the read gap by about 3.0 to 4.0 μm.

FIG. 3 is a schematic perspective view of a silicon planar magnetoresistive head showing the head structure according to the invention. The pole structure 30, 31, 32; read gap 15 and write gap 17; MRE 18; and write gap shunt 16 are shown in the figure. The figure also shows a notch 36 formed in each read pole structure 30, 31. The notches typically have a width "x" of 0.7 μm. The notches extend the separation of the two read gap poles to increase the active length of the MRE and thereby increases the read signal of the head. This also decreases the leakage flux between the poles, which increases the read signal and decreases the write field.

Graphical representations of head operation under various operating conditions are now discussed, and demonstrate that adequate write fields can be obtained by the head, and that the write gap shunt adequately suppresses signals that are read across the write gap.

Figure 4:
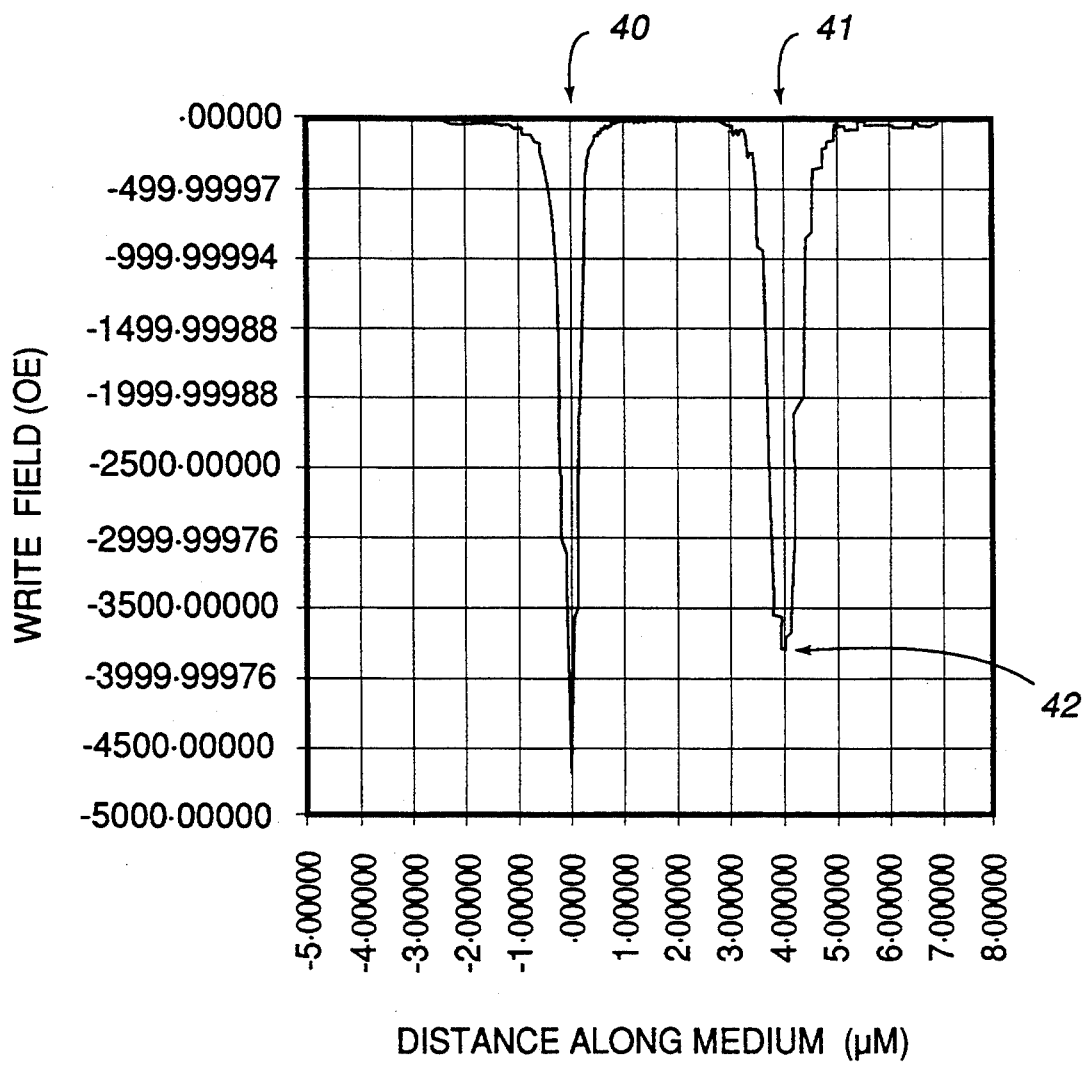
FIG. 4 is a graph plotting calculated write field strength versus distance along the track of a medium for a two gap silicon planar magnetoresistive head according to the invention.

FIG. 4 is a graph plotting write field strength (as indicated by numeric designator 41) in the medium near the write gap 17 and field strength (as indicated by numeric designator 40) near the read gap 15 for the exemplary two gap silicon planar magnetoresistive head. In the figure, the field near the write gap 17 in the medium for 1000 mAt in the write coil (e.g. a coil having a current of 40 ma coupled in 25 turns) is shown. The write field in the medium is about $3.0 \times 10^5$ At/m (3800 Oe), as indicated by numeric designator 42, which is adequate to write onto a $1.42 \times 10^5$ At/m (1800 Oe) medium. A large field gradient is obtained at the trailing edge of the gap.

The write field profile is wide enough (e.g. about 0.6 μm) to separate adequately the two transitions, i.e. the front and rear transitions of the write gap.

Figure 5:
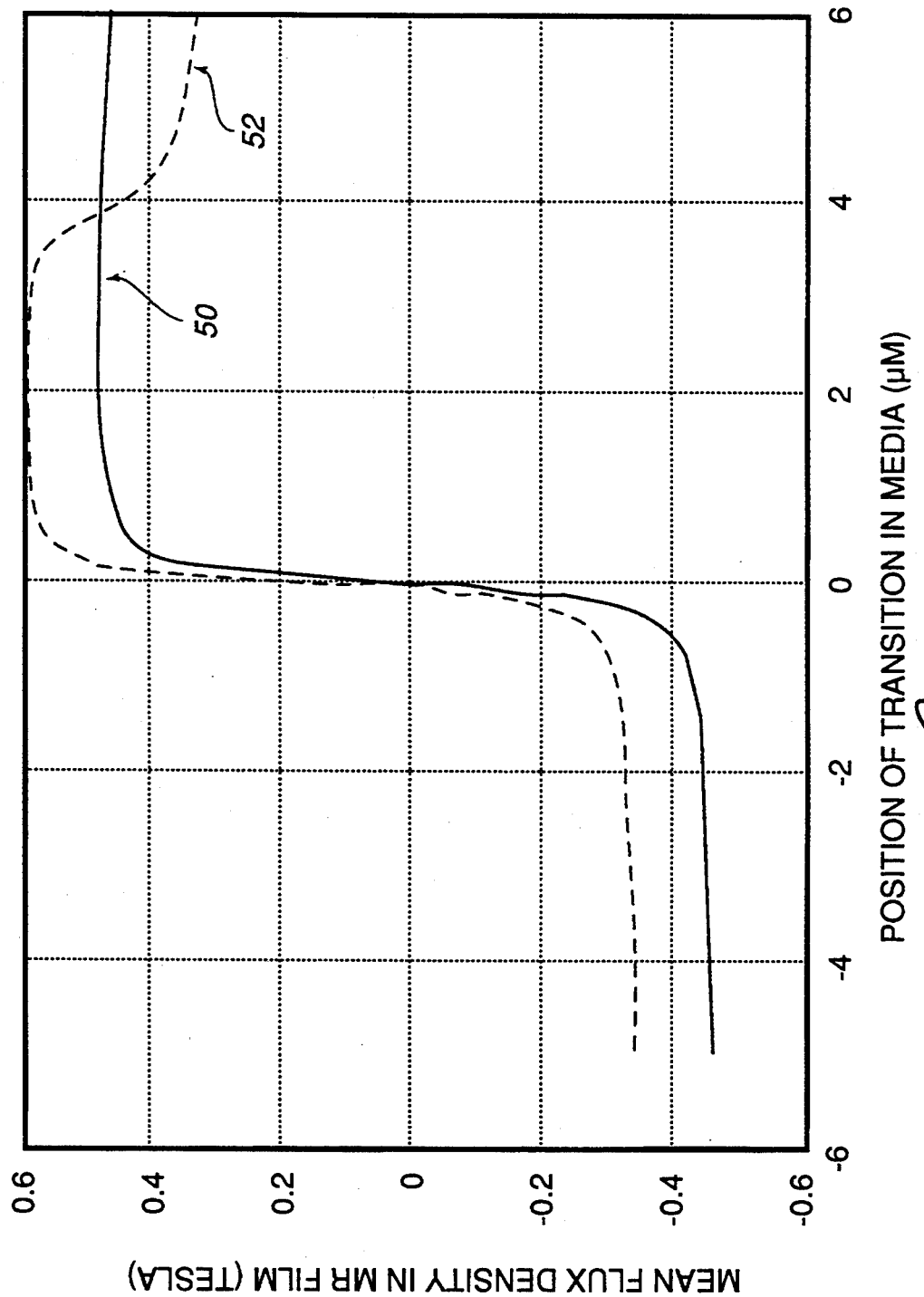
FIG. 5 is a graph plotting mean flux density in a magnetoresistive element versus position of a single magnetic transition in the medium for a two gap silicon planar magnetoresistive head according to the invention.

FIG. 5 is a graph plotting mean flux density in a magnetoresistive film for a single moving magnet transition in the medium versus the position of the transition in the medium for the exemplary two gap silicon planar magnetoresistive head. The figure shows the computed average signal flux density in the MRE vs. position in the medium for two cases: a) without a write gap shunt, as indicated by numeric designator 52; and b) with a 30 nm thick write gap shunt of NiFe as indicated by numeric designator 50. A large, undesirable secondary readback signal is produced if the WGS is not present. This secondary readback is insignificant when the write gap shunt is present.

From the foregoing it should be appreciated that the silicon planar magnetic head described herein has separate read and write gaps for reduced read noise from the track edges, and for good overwrite of old data. The head exhibits the same advantages described in the patent application, V. W. Hesterman, M. K. Bhattacharyya *A Planar Magnetoresistive Head*, Ser. No. 08/146,255__, filed Nov. 1, 1993. The head has a high signal to noise ratio and a substantially symmetrical cross-track response. It is also substantially immune to the stray magnetic flux in its vicinity. Thus, the magnetic head does not require magnetic shielding from the stray flux. Furthermore, in the head the MRE is positioned away from the ABS to significantly protect it from wear, shorting, and corrosion.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A magnetoresistive head, comprising:
   an air bearing surface;
   a read gap formed at said air bearing surface;
   a magnetoresistive element positioned proximate to said read gap;
   a discrete write gap spaced from said read gap;
   means for generating write signals at said write gap; and
   a write gap shunt positioned at said air bearing surface and traversing said write gap to suppress secondary readback of signals that are sensed across the write gap without interfering substantially with generation of said write signals at the write gap.

2. The head of claim 1, wherein said read gap has a gap length that defines a read track, said write gap has a write gap length that defines a write track, and said read track is either narrower or wider than said write track.

3. The head of claim 1, further comprising:
   first, second, and third poles; said first and second poles defining said read gap, and said second and third poles defining said write gap.

4. The head of claim 1, said means for generating write signals at said write gap further comprising:
   a write yoke; and
   a write coil formed about said yoke.

5. The head of claim 1, further comprising:
   a pair of ferromagnetic conductors electrically connected to said magnetoresistive element.

6. A silicon planar magnetoresistive read/write head, comprising:
   an air bearing surface;
   a pole magnetic structure including first, second, and third poles;
   a read gap defined by said first and second poles at said air bearing surface;
   a magnetoresistive element positioned across said read gap for reading stored magnetic information;
   a discrete write gap spaced from said read gap, said write gap defined by said second and third poles, wherein said read gap has a gap width that defines a read track width, said write gap has a write gap width that defines a write track width, and said read track is either narrower or wider than said write track;
   means for generating write signals at said write gap; and
   a write gap shunt at said air bearing surface traversing said write gap to suppress secondary readback of signals that are sensed across the write gap without interfering substantially with generation of said write signals at the write gap.

7. The head of claim 6, said means for generating write signals at said write gap further comprising:
- a write yoke; and
- a write coil formed about said yoke.

8. The head of claim 6, further comprising:
- a pair of ferromagnetic conductors electrically connected to said magnetoresistive element between said magnetoresistive element and said pole structure; and
- a dielectric spacer for insulating said conductors from said pole structure.

9. The head of claim 6, said first and second poles further comprising:
- a notched surface extending across said poles at said read gap to extend pole separation and increase magnetoresistive element length.

10. The head of claim 6, wherein said magnetoresistive element is positioned away from said air bearing surface.

11. The head of claim 6, wherein said read track width is about 1 $\mu$m.

12. The head of claim 6, wherein said read gap length is about 0.2 $\mu$m.

13. The head of claim 6, wherein said write track width is about 2 $\mu$m.

14. The head of claim 6, wherein said write gap length is about 0.6 $\mu$m.

15. The head of claim 6, wherein NiFe is used to make any of the magnetoresistive element, the write gap shunt, and the pole structure.

16. The head of claim 6, wherein said write gap shunt is about 30 nm thick.

17. The head of claim 6, wherein said magnetoresistive element is a giant magnetoresistive element.

18. A method for reading and writing with a silicon planar magnetoresistive head, comprising the steps of:
- during a write operation, generating a write current in a write coil; and
- generating a magnetic flux across a write gap with said write current to create a write signal;
- during a read operation, sensing a magnetic signal generated across a read gap formed at an air bearing surface of said magnetoresistive head, said read gap being discrete and spaced from said write gap; and
- coupling a sense current generated across said read gap through a magnetoresistive element to create a read signal; and
- suppressing signals that are sensed across the write gap with a write gap shunt positioned at said air bearing surface and traversing said write gap, without interfering substantially with generation of said write signals at the write gap.

* * * * *